J. Gunn. Sheet 2. 2 Sheets.
Attach'g Hubs to Axles.
Nº 91,228    Patented Jun. 15, 1869.
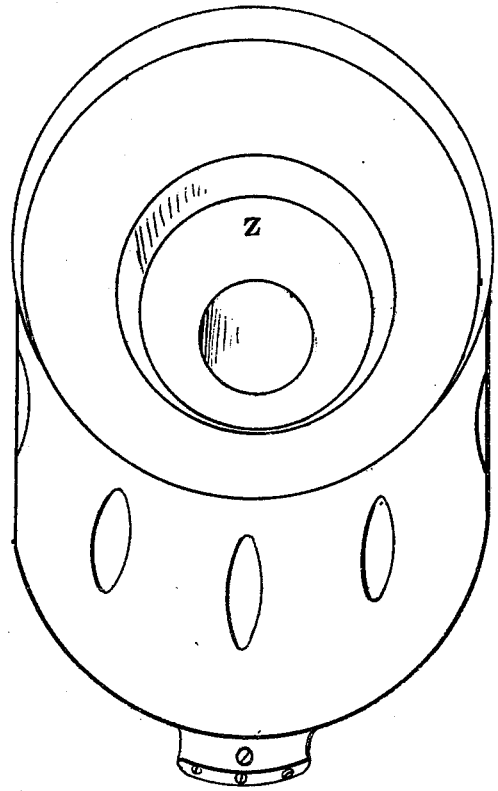
Witnesses
John B. Christian
W. F. Mason
Inventor
John Gunn

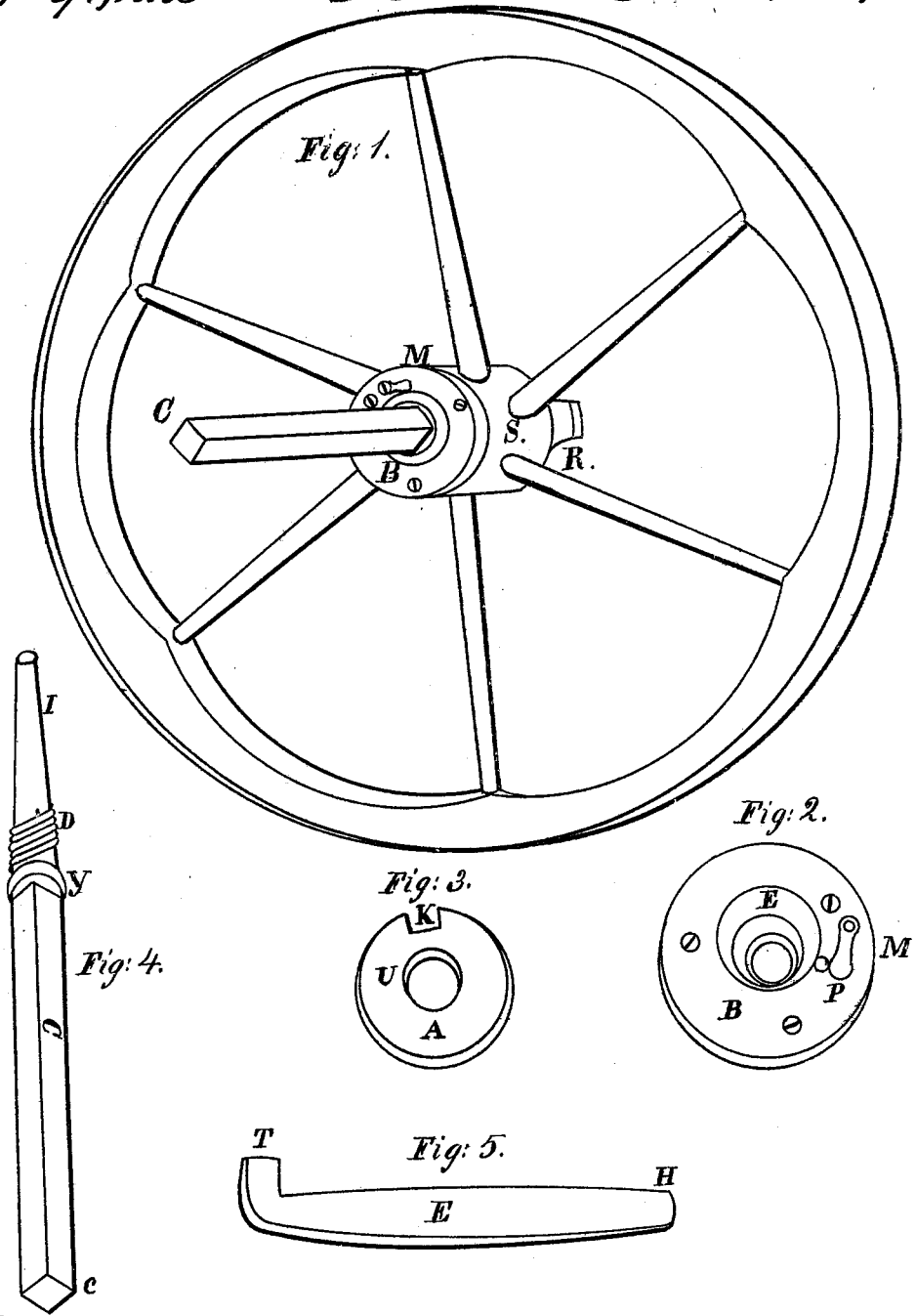

UNITED STATES PATENT OFFICE.

JOHN GUNN, OF SALEM TOWNSHIP, ILLINOIS.

IMPROVED MODE OF ATTACHING HUBS TO AXLES.

Specification forming part of Letters Patent No. 91,228, dated June 15, 1869.

*To all whom it may concern:*

Be it known that I, JOHN GUNN, of Salem Township, in the county of Carroll and State of Illinois, have invented an Improved Mode of Attaching Hubs to Axles.

The nature of my invention consists in attaching hubs to axles, so as to prevent dust or dirt of any kind from coming in contact with the arm of the axle, or oil or grease used on the same, and to prevent the oil or grease escaping from its chamber.

To enable others skilled in the art to make and use my invention, I will proceed to describe its construction and operation, reference being had to the annexed drawings, making a part of this specification, in which—

Figure 1, Fig. 2, plate B, Fig. 3, burr A, Fig. 4, axle C, Fig. 5, key E, are perspective views.

I provide a hollow chamber in the inner end of hub S for burr A, Fig. 4. Burr A, with a screw or thread, U, and notch K, is placed in the chamber in the inner end of hub S. I then attach plate B with collar E, Fig. 2, and key-hole P and slide M on the inner end of hub S with three screw-bolts. I then place arm I of Fig. 4, letter C, in the hole in plate B, Fig. 2, until screw D enters into screw or thread U in burr A, Fig. 3. Then I turn hub S until key-hole P in plate B, Fig. 2, will correspond with notch K in burr A, Fig. 3. Then I place the T end of key E, Fig. 5, in hole P, plate B, Fig. 2. I then turn the hub forward until burr A is screwed upon arm I until collar E on plate B, Fig. 2, will cover collar Y on axle-tree, Fig. 4. Pipe R in the outer end of hub S goes through the wood on one side of the hub, and is screwed into the common boxing of the hub. Pipe R is for oiling the spindle or arm of the axle-tree, and the screw in pipe R is to prevent oil from getting out or dirt from getting in. The outer end of the common pipe is closed to prevent the oil from escaping, and collar E on plate B, Fig. 2, prevents the oil from getting out or dirt from getting in, and slide M is for the same purpose.

This improvement can be attached to and used on iron axle-trees, thimble-skein, or cast arms for wagons or carriages.

By the use of this improvement a wagon or carriage can be oiled without unloading or removing the wheel, and with less than one-half of the oil now used by the present mode.

What I claim as my invention, and desire to secure by Letters Patent, is—

The combination of the chamber Z in the hub S with the burr A, the plate B, the collar C on plate B, and the screw D on the axle, Fig. 4, substantially as and for the purpose specified.

JOHN GUNN.

Witnesses:
    JOHN B. CHRISTIAN,
    W. N. NASON.